United States Patent [19]

Nishishita et al.

[11] Patent Number: 5,495,972
[45] Date of Patent: Mar. 5, 1996

[54] METHOD AND APPARATUS FOR CUTTING FLAT TUBES

[75] Inventors: Kunihiko Nishishita; Takashi Sugita, both of Saitama, Japan

[73] Assignee: Zexel Corporation, Tokyo, Japan

[21] Appl. No.: 350,991

[22] Filed: Nov. 29, 1994

Related U.S. Application Data

[62] Division of Ser. No. 35,239, Mar. 23, 1993, Pat. No. 5,407,116, which is a continuation of Ser. No. 797,768, Nov. 1, 1991, abandoned, which is a continuation-in-part of Ser. No. 591,276, Oct. 2, 1990, abandoned.

[30] Foreign Application Priority Data

Oct. 4, 1989 [JP] Japan ..................... 1-259631

[51] Int. Cl.⁶ ..................... B32D 21/00
[52] U.S. Cl. ............... 225/2; 225/4; 225/96.5; 225/101
[58] Field of Search ............... 225/2, 96.5, 101, 225/4; 29/890.053, 413; 72/131, 183, 203

[56] References Cited

U.S. PATENT DOCUMENTS

| | | | |
|---|---|---|---|
| 1,366,063 | 1/1921 | Culhane, Jr. | |
| 3,052,975 | 9/1962 | Walters et al. | 29/413 |
| 3,112,559 | 12/1963 | Pauls | 29/157.3 |
| 3,254,400 | 6/1966 | Gordon | 29/413 |
| 3,268,137 | 8/1966 | Martin | 225/2 |
| 3,568,488 | 3/1971 | Franks | 72/68 |
| 3,679,109 | 7/1972 | King, Jr. | 225/2 |
| 3,692,219 | 9/1972 | Franks | 225/2 |
| 3,730,411 | 5/1973 | Brockmuller | 225/100 |
| 3,747,456 | 7/1973 | Kochinashvili et al. | 83/404 |
| 3,757,627 | 9/1973 | Lange | 83/558 |
| 3,866,449 | 2/1975 | Wakabayashi et al. | 72/70 |
| 3,877,625 | 4/1975 | Brock | 225/2 |
| 4,111,346 | 9/1978 | Bertolette | 225/96.5 |
| 4,216,004 | 8/1980 | Brehm et al. | 65/2 |
| 4,226,352 | 10/1980 | Watson | 225/100 |
| 4,552,291 | 11/1985 | Schott | 225/96.5 |
| 4,910,991 | 3/1990 | Bertolette et al. | 72/370 |
| 5,133,492 | 7/1992 | Wohrstein et al. | 225/2 |
| 5,143,268 | 9/1992 | Stroup, Jr. | 225/2 |

FOREIGN PATENT DOCUMENTS

| | | | |
|---|---|---|---|
| 1752448 | 3/1978 | Germany | 225/105 |
| 54-132883 | 10/1979 | Japan . | |
| 2198798 | 8/1990 | Japan | 225/2 |

*Primary Examiner*—Rinaldi I. Rada
*Attorney, Agent, or Firm*—Sughrue, Mion, Zinn, Macpeak & Seas

[57] ABSTRACT

A method of cutting a flat tube (6) into unit pieces, which includes moving in a transverse direction rotatable disc cutters (12) with knife edges so as to cut the upper and lower walls of a flat tube to form a pair of cutting grooves (15) and fixing the flat tube at a point upstream of the cutting groove while flexing in the vertical direction a length of the flat tube downstream of the cutting grooves to break it off at the cutting grooves, thereby providing a unit piece of a predetermined length.

7 Claims, 3 Drawing Sheets

5,495,972

METHOD AND APPARATUS FOR CUTTING FLAT TUBES

CROSS-REFERENCE TO RELATED APPLICATIONS

This is a divisional of application Ser. No. 08/035,239 filed Mar. 23, 1993, now U.S. Pat. No. 5,407,116, which is a continuation of application Ser. No. 07/797,768 filed Nov. 1, 1991, which is a continuation-in-part application of application Ser. No. 07/591,276 filed Oct. 2, 1990 both abandoned.

BACKGROUND OF THE INVENTION

1. Field of the Invention

The present invention relates generally to methods of manufacturing heat exchanger tubes and, more particularly, to a method of cutting flat tubes into unit pieces for heat exchanger.

2. Description of the Prior Art

Flat tubes of a heat exchanger of the parallel flow type, for example, have one or more refrigerant passages therein. Such flat tubes are made by forming by extrusion a continuous tube and then cutting it into unit pieces with a tube cutter which is provided on a conveyor line. The height and the width of the continuous tube are adjusted either before or after the cutting step.

The conventional cutting techniques include (1) a metal cutting process; (2) a press cutting process; (3) a laser cutting process; and (4) a process which includes forming circumferential grooves on the continuous tube with a rotary cutter and applying a tension to the continuous tube to break it into unit pieces at the circumferential grooves. See Japanese Patent Application Kokai No. 63- 264218.

In the metal cutting process, not only chips or sawdust is produced but also undesirable burrs are formed on the cut surface. As a result, a considerable number of refrigerant passages in the unit pieces are choked with the sawdust and/or closed by the burrs. For this reason, the metal cutting process requires an additional burring step, resulting in the increased unit manufacturing cost.

In the press cutting process, the cut plane of a unit piece is susceptible to deformation due to collapse of the refrigerant passage under the press action. Also, it is often that burrs are formed on the cut plane. For these reasons, this process requires not only a burring step but also a passage expansion step, resulting in the increased unit manufacturing cost.

The laser cutting process relies on the thermally fusing action of laser for cutting a continuous tube so that part of the fused material deposits on the cut surface of a unit piece. For this reason, a step of removing such deposits is required, increasing the unit manufacturing cost.

The last process mentioned above which includes forming cutting grooves on the continuous tube with a rotary cutter and applying a tension to the continuous tube to pull it into unit pieces at the cutting grooves, has a disadvantage particularly for flat tubes into which the cutter blade tends to cut through, forming burrs and choking some of the refrigerant passages as in the press cutting process. In addition, the continuous tube is pulled into unit pieces by the rollers in the direction of travel of the tube so that the cut planes have rough surfaces, requiring an additional finishing step, resulting in the increased unit manufacturing cost.

SUMMARY OF THE INVENTION

Accordingly, it is an object of the invention to provide a method of cutting flat tubes into unit pieces, which requires no such a step as removal of the sawdust, burrs, or fuse deposits, or expansion or cleaning of the cut ends, thus reducing the unit manufacturing cost.

In accordance with the invention there is provided a method of manufacturing a heat exchanger tube by cutting a flat continuous tube having a refrigerant passage premolded by extrusion into unit pieces each having a predetermined length, the method including the steps of moving rotatable disc cutters with knife edges so as to cut transversely the upper and lower walls of the flat tube to form upper and lower cutting grooves; and fixing the flat tube at a point upstream of the cutting grooves while flexing a length of the flat tube downstream of the cutting grooves to break it off at the cutting grooves, thereby providing a unit piece of the flat tube.

By the above method, a pair of cutting grooves are formed on the upper and lower walls with a pair of rotating disc cutters. Then, a length of the flat tube downstream of the cutting grooves is flexed at the cutting grooves in the vertical direction to break it off as a unit piece having a predetermined length.

DESCRIPTION OF THE PREFERRED EMBODIMENT

Figure 1:
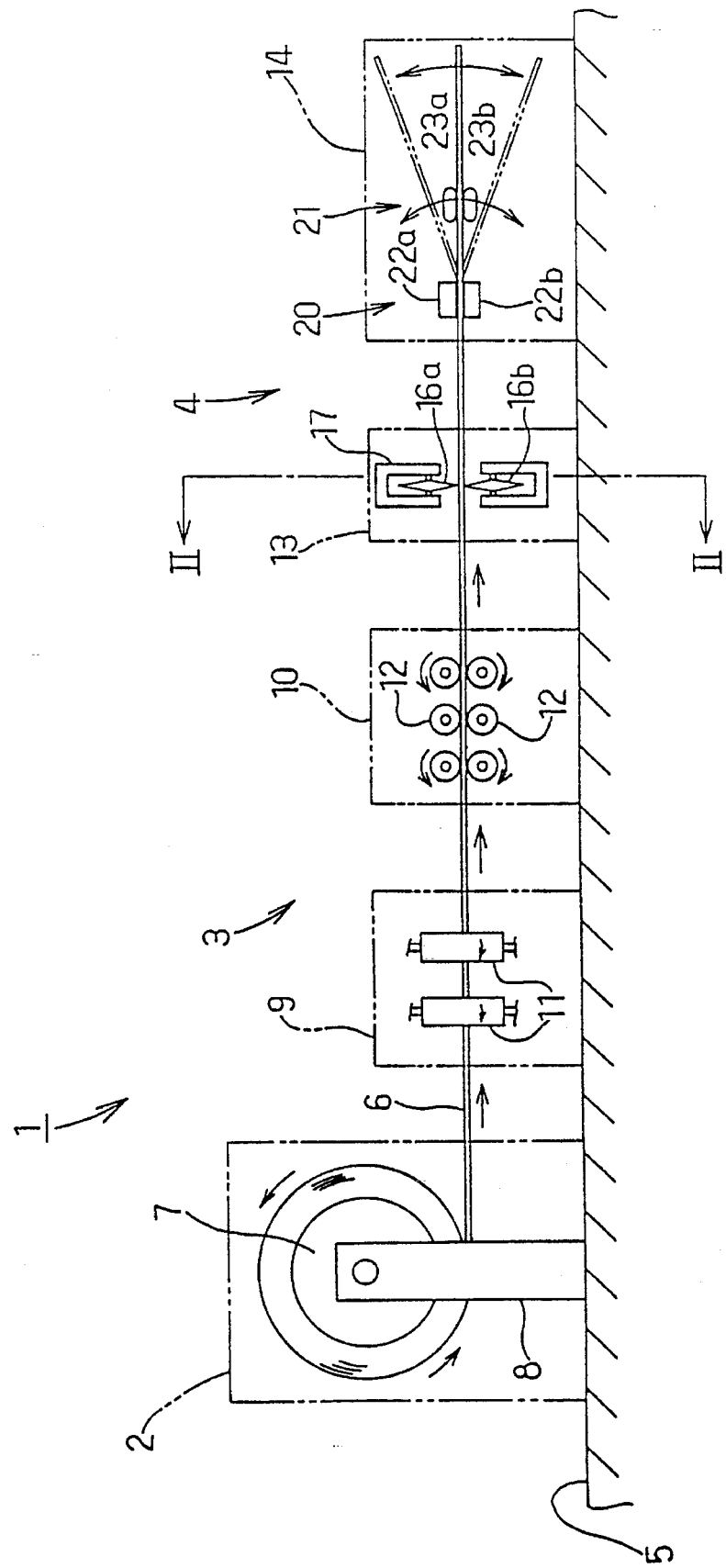
FIG. 1 is a schematic side view of an apparatus for manufacturing a heat exchanger flat tube useful for carrying out a method of the invention.

In FIG. 1, the apparatus I for manufacturing heat exchanger flat tubes includes a continuous tube feed station 2; a tube shaping station 3; and a tube separating station 4, all of which are placed in a line on a floor 5. A continuous tube 6 having refrigerant passages therein is continuously fed from the feed station 2 in one direction along which the shaping station 3 and the separation station 4 are placed.

Figure 2:
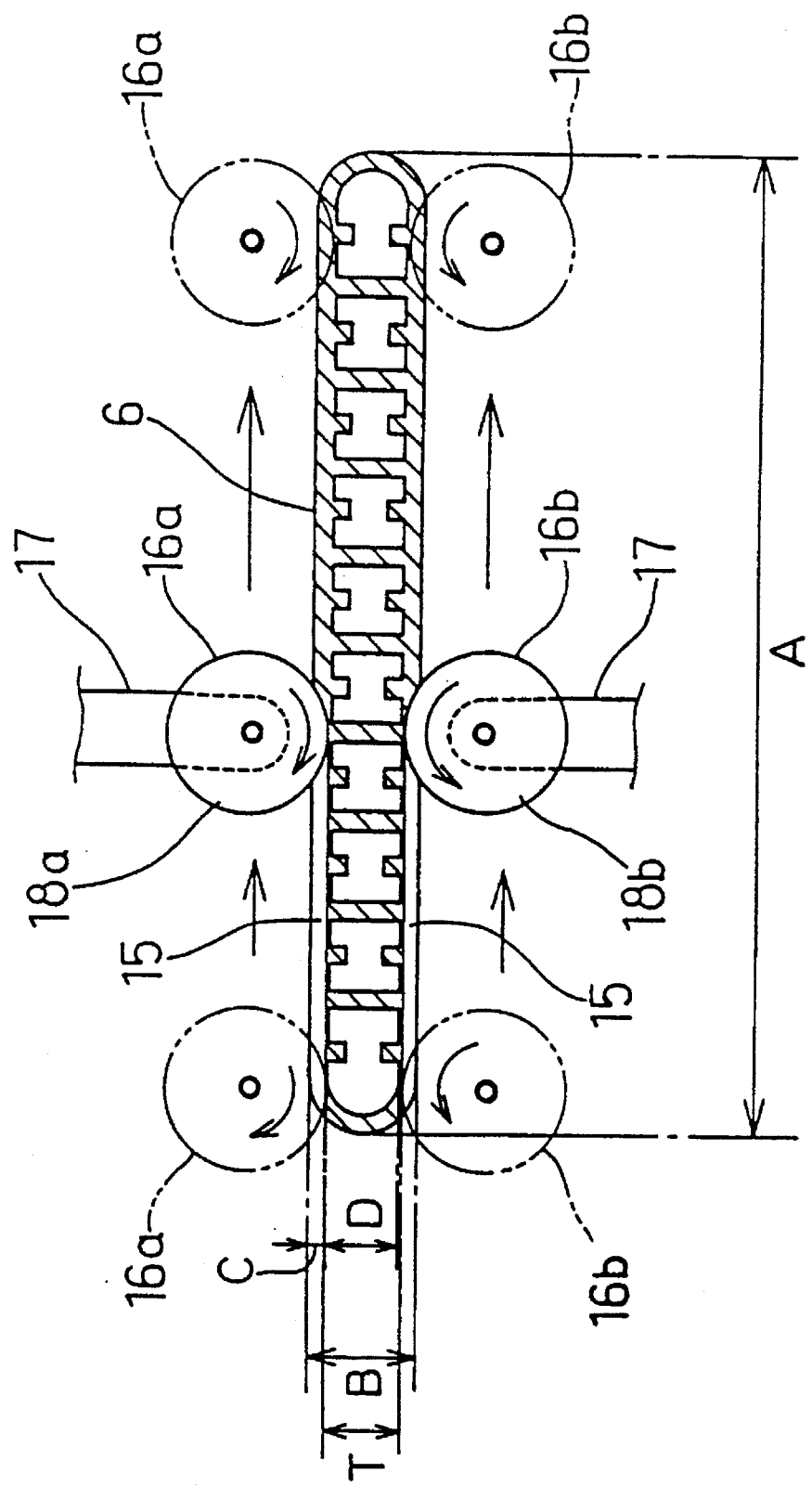
FIG. 2 is a cross sectional view of a groove forming section of the apparatus of FIG. 1.

As FIG. 2 shows, the continuous flat tube 6 has a substantially elliptical cross section having a width A and a height B and a plurality of refrigerant passages defined by partitions along the length.

The feed station 2 includes a cylindrical drum 7 around which the continuous tube 6 is wound and a drum support 8 for supporting the drum 7 for rotation.

The shaping station 3 placed downstream of the feed station 2 includes a vertical correction section 9 which consists of pairs of vertical rollers 11 disposed so as to contact the continuous tube 6 on opposite sides and a horizontal correction section 10 which consists of pairs of horizontal rollers 12 disposed so as to contact the continuous tube 6 on the upper and lower surfaces.

After having been shaped to have a predetermined width A in the vertical correction section 9, the continuous tube 6 is shaped in the horizontal correction section 10 so as to have a predetermined height B, thereby correcting any curl, distortion and/or the like which has been caused by winding of the continuous tube around the drum, thus providing a straightened continuous tube. In this embodiment, the horizontal correction section follows the vertical correction section, but these sections may be placed in the reverse order. Also, it is possible to place these sections downstream of the separation station 4.

The separation station 4 placed downstream of the shaping station 3 includes a groove forming section 13 and a tube breaking section 14.

The groove forming section 13 includes a pair of disc cutters 16a and 16b for forming upper and lower cutting grooves 15 on the upper and lower surfaces of the continuous tube 6 and a disc cutter support 17 for supporting the disc cutters 16a and 16b for rotation.

As FIG. 2 shows, each of the disc cutters 16a and 16b has an identical cutting disc provided with cutting edge 18a or 18b and supported with some play by the support 17 such that the cutting discs 16a and 16b rotate in a common plane. The distance T between the cutting edges 18a and 18b is adjusted according to the height B and the wall thickness C of a continuous tube 6. In this embodiment, the cutting distance T is set substantially equal to the distance (B− 2C) so that all of the upper and lower walls are cut up. It is noted, however, that the cutting distance T may be adjusted to satisfy a relational expression D<T<B where D is the inside minor diameter between inside surfaces of the upper and lower walls of a continuous tube 6. The cutter support 17 is made movable in a direction in parallel to the floor 5 and in traverse to the feed direction of a continuous tube 6.

Figure 3:
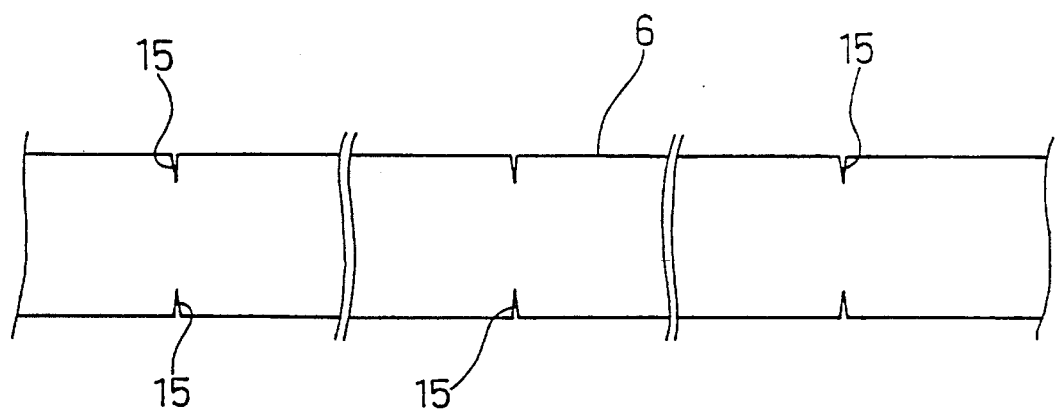
FIG. 3 is a side elevational view a continuous tube provided with cutting grooves by a method of the invention.

As FIG. 3 shows, the cutting grooves 15 of a predetermined depth are formed on the upper and lower walls of a continuous tube 6 at predetermined intervals by moving the cutter support 17 in a direction traverse to the feed direction of the continuous tube 6 so that the rotating cutter discs 16a and 16b intersect the continuous tube 6. With such an arrangement, the rotating discs cut into the walls, forming a pair of cutting grooves which are free from chips and burrs. Thus, removal of chips and/or burrs is made unnecessary. In addition, with this arrangement, expansion of passages at the cut ends is also unnecessary. In this embodiment, the feed of a continuous tube is stopped temporarily during the formation of cutting grooves.

The tube breaking section 14 includes a fixing subsection 20 and a swinging subsection 21. The fixing subsection 20 includes a pair of clamping members 22a and 22b for clamping the continuous tube 6 at a position upstream of the cutting grooves 15. The swinging subsection 21 placed downstream of the fixing subsection 20 includes a pair of clamping members 23a and 23b for clamping the continuous tube 6 at a position downstream of the cutting grooves 15.

Figure 4:
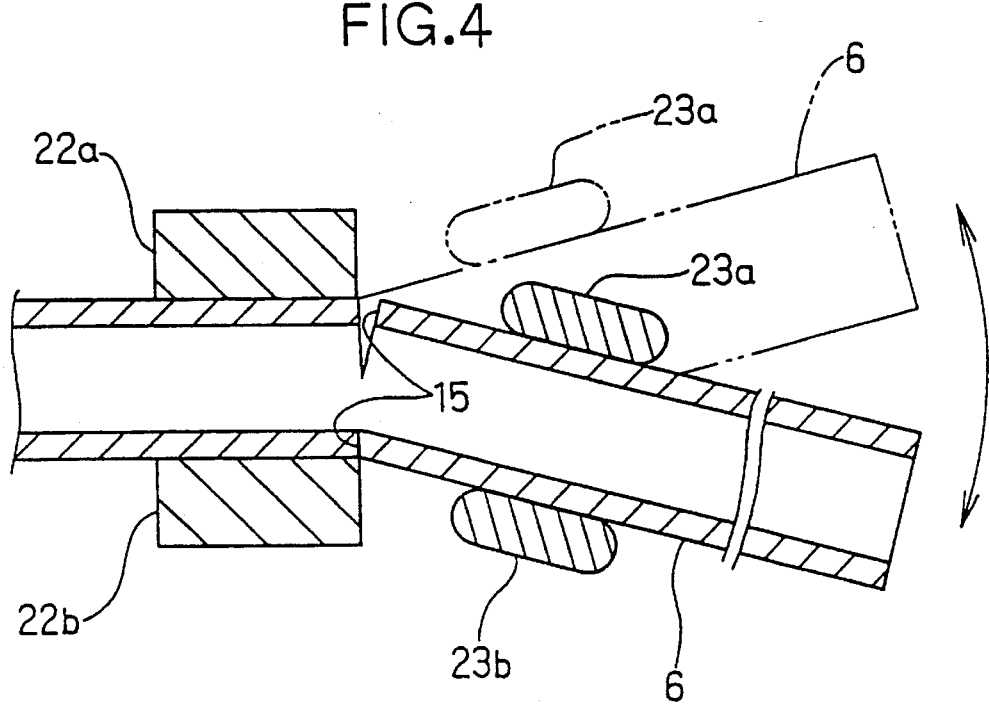
FIG. 4 is a longitudinal section of a swinging station of the apparatus of FIG. 1.

As FIG. 4 shows, the clamping members 23a and 23b are flexed once upwardly or downwardly, or swung at the cutting grooves 15 as indicated by an arrow. As a result, the continuous tube 6 is broken at the cutting grooves 15, providing a unit piece of the predetermined length. Since the cutting grooves extend substantially through the wall thickness, it is easy to break off the unit piece from the remainder. In contrast to the prior methods, no refrigerant passage is choked with chips or closed by burrs. In other words, the unit piece has neatly cut ends. In this embodiment, the feed of a continuous tube 6 is stopped temporarily in the tube breaking section 14.

After subjected to various steps such as washing, blowing, and drying, a number of unit pieces are assembled and brazed into a heat exchanger unit. According to the invention it is possible to eliminate the steps of reshaping the passage openings and the end surfaces of a unit piece, thereby reducing the unit manufacturing cost and increasing the productivity.

While a pair of disc cutters 16a and 16b are used in the above embodiment, it is possible to use two or more pairs of disc cutters, the cutting distance T of which is decreased stepwise or which are arranged in a zigzag fashion. The feed of a continuous tube is stopped temporarily during movement of the disc cutters across the continuous tube, gripping the continuous tube on the both sides across the cutting grooves, and vertical swinging of the unit piece portion downstream of the cutting grooves, but it is possible to perform a series of process steps including the groove formation without stopping the tube feed by synchronizing the respective steps.

We claim:

1. A method of cutting a flat multiport tube having a plurality of passages into unit pieces, which comprises the steps of:

feeding in a first direction a flat multiport tube having an upper wall, a lower wall, and side walls, moving a pair of disc cutters in a second direction perpendicular to said first direction to form a pair of cutting grooves on said upper and lower walls, fixing said flat multiport tube at a position upstream of said cutting grooves; and moving an end portion of said flat multiport tube downstream of said cutting grooves relative to said fixed flat multiport tube so as to break off said end portion at said cutting grooves;

said cutting grooves having a distance T between them that satisfies the following relational expression:

$$D<T<B$$

wherein B and D are a height and an inside minor diameter of said flat metal tube so that part of said upper and lower walls remains uncut, thereby preventing not only production of any cutting burrs but also sawdust clogging and collapse of said passages, and further wherein said step of feeding said flat multiport tube in said first direction is in synchronism with said step of moving said pair of disc cutters in said second direction to form said pair of cutting grooves so that said cutting grooves are formed without stopping said flat tube feeding during said cutting groove formation.

2. A method of separating an extruded tube member with parallel preformed passages into sections, said tube member having an upper wall and a lower wall, said method comprising the steps of:

providing a groove in said upper wall of said tube member to a depth less than the thickness of said upper wall, providing a groove in said lower wall of said tube member to a depth less than the thickness of said lower wall of said tube member, said grooves in said upper and lower walls being aligned and extending transversely of said tube member, thereby defining tube member first and second portions, and applying a force to said tube member at a location apart from said grooves, whereby said tube member is severed at said grooves, wherein said groove providing step and said force applying step are conducted in synchronism while said tube member is continuously fed.

3. Apparatus for use in separating a substantially flat, thin-walled extrusion, having a plurality of passages extending in a longitudinal direction therein into a plurality of sections, the extrusion having an upper wall and a lower wall, said apparatus comprising:

a first clamping assembly for clamping said extrusion at a first location;

a second clamping assembly for clamping said extrusion at a second location separated in said longitudinal direction from said first location;

fault forming means disposed between said first clamping assembly and said second clamping assembly, said fault forming means being operable for movement in a lateral direction substantially orthogonal to said longitudinal direction and for forming a fault in the surface of said upper and lower walls along a first fault line, defining first and second extrusion sections; and apparatus for moving one of said first clamping assembly and said second clamping assembly relative to the other said clamping assembly for breaking said extrusion at said fault line to thereby sever said first extrusion section from said second extrusion section, wherein said fault forming means and said moving apparatus operate in synchronism as said tube is continuously fed.

4. An apparatus for separating an extruded tube member with parallel preformed passages into sections, said tube member having an upper wall and a lower wall, said apparatus comprising:

means for feeding the extruded tube member continuously without stopping;

means for forming a groove in said upper wall of said tube member to a depth less than the thickness of said upper wall, means for forming a groove in said lower wall of said tube member to a depth less than the thickness of said lower wall of said tube member, said grooves in said upper and lower walls being aligned and extending transversely of said extrusion, thereby defining tube member first and second portions, and means for applying a force to said tube member at a location apart from said grooves, whereby said tube member is severed at said grooves, wherein said groove forming means and said force applying means are repetitively operated in synchronism as said tube feeding means is operative to continuously feed said tube member without stopping.

5. A method of separating a thin-walled, multiport extrusion into sections, said extrusion having an upper wall and a lower wall, said method comprising:

continuously feeding said extrusion from a supply;

providing a groove in said upper wall of said extrusion to a depth less than the thickness of said upper wall, providing a groove in said lower wall of said extrusion to a depth less than the thickness of said lower wall, said grooves in said upper and lower walls being aligned and extending transversely of said extrusion, thereby defining extrusion first and second portions, and applying a force to said extrusion at a location apart from said grooves, whereby said extrusion is severed at said grooves, wherein said groove providing step and said force applying step are repetitively conducted in synchronism as said extrusion is continuously fed without stopping.

6. The method of claim 5, wherein said groove is made substantially through but without penetrating each of said upper and lower walls.

7. The method of claim 5, wherein said force applying step further comprises applying a breaking force to at least one of said first and second portions.

* * * * *